United States Patent
Stephens, Jr.

(10) Patent No.: US 6,633,324 B2
(45) Date of Patent: Oct. 14, 2003

(54) SYSTEM AND METHOD FOR VIDEO CALL CONFIGURATION AND SCHEDULING

(75) Inventor: James H. Stephens, Jr., Austin, TX (US)

(73) Assignee: Forgent Networks, Inc., Austin, TX (US)

( * ) Notice: Subject to any disclaimer, the term of this patent is extended or adjusted under 35 U.S.C. 154(b) by 246 days.

(21) Appl. No.: 09/919,560

(22) Filed: Jul. 31, 2001

(65) Prior Publication Data

US 2003/0025787 A1 Feb. 6, 2003

(51) Int. Cl.[7] .................................. H04N 7/14
(52) U.S. Cl. ................. 348/14.09; 379/93.21; 379/202.01; 370/261; 709/204
(58) Field of Search .................. 348/14.08, 14.09, 348/14.01; 379/93.21, 202.01; 370/260, 261; 709/204

(56) References Cited

U.S. PATENT DOCUMENTS 6,157,401 A * 12/2000 Wiryaman ............... 348/14.09

* cited by examiner

*Primary Examiner*—Wing Chan
(74) *Attorney, Agent, or Firm*—Baker Botts L.L.P.

(57) ABSTRACT

A method and system configures video calls and schedules the calls for a video call network based on a query from a user to establish a video call between end points of the video call network. A configuration engine accepts video call information from a query engine based on the video call request and applies device data and rules to determine one or more possible call configurations. The configuration engine or an associated optimization engine determines a preferred video call configuration and schedules devices of the video call network without requiring the user to have any in depth understanding of the device limitations and capabilities. Automatic configuration and scheduling of video calls simplifies the use of a video call network to reduce the expense and complexity of efficiently using network resources.

21 Claims, 2 Drawing Sheets

| DEVICE | PORTS | BANDWIDTH | RELIABILITY | SCHEDULE |
|---|---|---|---|---|
| $MCU_1$ | 3 | 1.0Mbps | .95 | OPEN |
| $MCU_2$ | 10 | 1.5Mbps | .8 | 12:30–2:00 |
| $MCU_3$ | 5 | 1.0Mbps | .9 | 11:30–12:30 |
| $GW_1$ | 3 | 1.0Mbps | .8 | 11:00–2:00 |
| $GW_2$ | 5 | 1.5Mbps | .9 | OPEN |

| DEVICE | NETWORK | PROTOCOL | SCHEDULE |
|---|---|---|---|
| $EP_1$ | SUBNET A | H.323 | OPEN |
| $EP_2$ | SUBNET B | H.323 | OPEN |
| . | . | . | . |
| . | . | . | . |
| $EP_N$ | SUBNET N | H.320 | OPEN |

SYSTEM AND METHOD FOR VIDEO CALL CONFIGURATION AND SCHEDULING

TECHNICAL FIELD

This invention relates generally to video call communications, and more specifically relates to a system and method for configuring and scheduling of video calls.

BACKGROUND

Video conference calls have developed from a novelty used rarely to grow into a commonly used business communication tool. Businesses often prefer the more personal communication available through video conferences compared with telephone conferences, and also enjoy savings in travel costs while still having a personal presence among the participants that is not possible with audio only communications. Further, video conferencing allows individuals at a number of disparate locations to share data, such as presentations and spreadsheets, while conducting a conference, thereby reducing the complexity of distributing written material before the conference occurs.

These advantages of video conferencing has resulted in a number of businesses installing video conferencing equipment for use by employees to communicate with other business locations across the business' network. Additionally, businesses commonly communicate outside of their network, such as with video equipment located in a customer's network, by establishing video calls through the public network.

The advantages and convenience of video calls are often offset by the difficulty of configuring and scheduling video calls in light of the limited video conferencing equipment available, the technical knowledge generally required to configure video calls, and demands on network bandwidths. For instance, a multi-point video conference call between three or more video end points typically requires the use of a multi-call unit (MCU) to coordinate the exchange of video data between the video end points. Thus, before establishing a multi-point video conference, the end point and MCU are configured to support the video conference. As another example, video end points sometimes use different protocols so that a video conference between such end points typically requires a configuration with a gateway that insures a consistent communications pathway. In addition, for video conference calls that involve a large number of participants at distributed locations, the bandwidth generally used to support the multiple end points tends to exceed the capacity of individual MCU's and gateways so that multiple MCU's and gateways are needed to configure the video call.

To coordinate video conference equipment use, businesses typically dedicate staff that accepts requests for use of end points, schedules the video network devices to support the video call and coordinates and configures the video call. Maintaining staff for this purpose increases the expense of video conferencing and reduces its convenience. Further, for businesses with expensive video conferencing resources the task of coordinating use of those resources is complex and labor intensive. The complexity and labor associated with video conferencing grows as the number of participants outside the business' network increases.

A significant problem that businesses encounter with video conferencing is the under utilization and non-optimized use of video conferencing equipment. For instance, conference calls can be difficult to configure, especially complex calls that are configured with MCU's that are set up to accomplish the call. The use of a variety of different devices leads to scheduling difficulties for the resources that are available. In some instances, staff is simply overwhelmed and unable to keep up with video conferencing requests in a timely manner. This can lead to under utilization of the video conferencing equipment or an increase in staff size and corresponding increase in labor expense. Further, as the complexity of configuring and scheduling video conferences increases, business members are less likely to use video conferencing equipment because the time and hassle in arranging a video conference is not worthwhile. In addition, complexity leads to unreliability so that business members will avoid video conferences to reduce potential embarrassment when the conferences fail.

SUMMARY

Therefore a need has arisen for a system and method which automatically configures video calls in a simplified and efficient manner.

A further need has arisen for a system and method which schedules video calls automatically in a more optimized manner so that video conferencing equipment is more efficiently used.

In accordance with the present invention, a system and method is provided that substantially eliminates disadvantages and problems associated with previously developed systems and methods for configuring video calls and scheduling those calls. A video network platform accepts queries with video call information for establishing a video call between plural video end points. A configuration engine associated with the video network platform applies rules and device data to determine one or more video call configurations available for scheduling a video call corresponding to the video call information.

More specifically, the video network platform analyzes queries for video calls, determines configurations to support the video calls and schedules video network devices accordingly. A rules based configuration engine accepts video call information from the queries and applies rules and device data to determine one or more video call configurations for a video call corresponding to the video call information. The device data is provided by a device database that stores information associated with devices available for the video call, such as video end points, MCU's and gateways. The device data includes information for establishing and maintaining a video call including device address, bandwidth, port, protocol, and scheduling availability information. The rules are provided by a rules database and define parameters for configuring and scheduling video calls. In alternative embodiments, the configuration engine uses alternative scheduling engines to determine potential video call configurations and schedules.

The configuration engine determines one or more video call configurations based upon the number, location and type of devices available. For instance, if a query requests a video conference between three end points, a rule applied by the configuration engine determines that an MCU is needed. The configuration engine then determines the available MCU's for configuring the video conference and presents the possible configurations for scheduling of the video call. In one embodiment, the configuration engine determines a preferred configuration and schedules the video call by saving the schedule information for the devices associated with the video conference in the device database.

An update engine interfaces with the device database to update the device data as device status changes on the video call network. For instance, if an end point, MCU or gateway device becomes inoperable, the update engine updates the scheduling data for the device in the device database so that the configuration engine will not schedule the device during down time. The update engine also tracks reliability information and stores the reliability information for devices in the device database. The configuration engine may then apply rules that use reliability information in determining video call configurations and scheduling devices for a video call.

An optimization engine interfaces with the configuration engine to aid in the selection of an efficient video call configuration based on desired optimization parameters. For instance, in one embodiment the optimization engine accepts possible video call configurations from the configuration engine and selects the most efficient of the possible video call configurations for scheduling of the devices associated with that video call configuration. In some instances, such as for complex video call networks with a relatively large number of devices, the number of possible video call configurations is quite large. In such instances, the optimization engine provides alternatives to the configuration engines so that the computations for determining possible configurations are reduced. For instance, the optimization engine may use estimation techniques that reduces the number of devices considered for a configuration. In yet another embodiment, the optimization engine considers existing schedules stored in the device database and computes a more optimal use of device resources, including rescheduling of devices to obtain better efficiency and utilization of the video call network as a whole.

The present invention provides a number of important technical advantages. One important technical advantage is that the configuration and scheduling of video calls is automated and simplified. The reduced complexity reduces the labor and cost associated with arranging video calls and increases the convenience so that individuals are encouraged to use video call devices. Further, establishing video calls between different video call networks is simplified by providing device data for the different networks in the device database. Thus, a central video network platform offers configuration and scheduling services for multiple companies in a straight forward and cost-effective manner.

Another important technical advantage of the present invention is that video call networks are used in a more efficient manner. By reducing complexity and simplifying call configuration and scheduling, device resources are less likely to go unused since coordination through scheduling staff is reduced. Further, optimization of schedules improves the utilization of devices so that the size and cost of a business' video call network may be reduced.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments of the present invention are illustrated in the figures, like numerals being used to refer to like and corresponding parts of the various drawings.

Ideally, a user who wishes to arrange a video call generally prefers a simplified interface for establishing the video call, much as a telephone call usually requires only the input of a phone number into a numerical pad. Unfortunately, video calls, especially large conference calls, tend to require device resources that support the call but are otherwise hidden from the user during the call. Thus, to configure and schedule a video call, a user has to deal with devices that supports the video call with which the user generally is otherwise unfamiliar.

Figure 1:
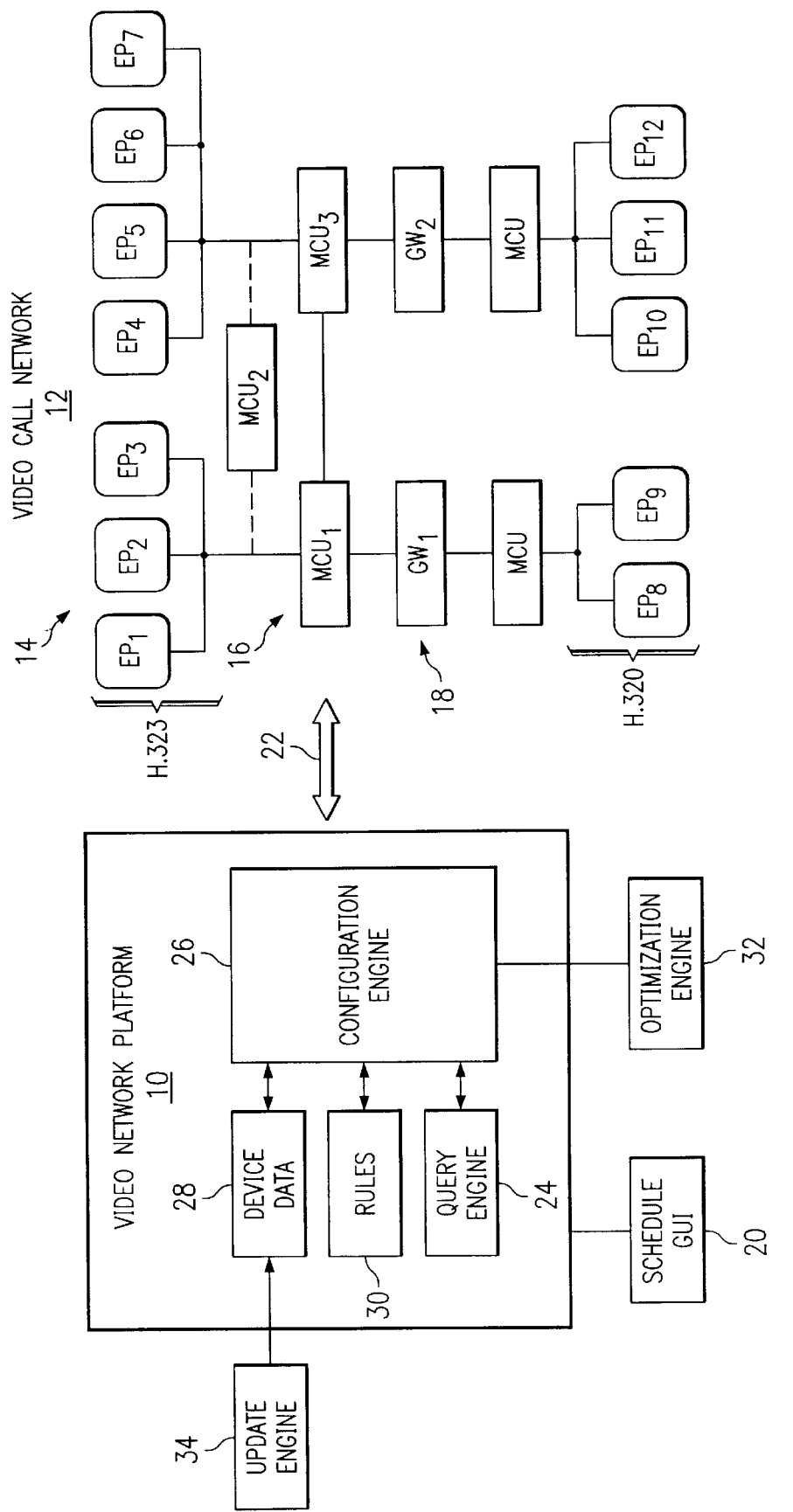
FIG. 1 depicts a block diagram of a video network platform interfaced with a video call network.

Referring now to FIG. 1, a block diagram depicts a video network platform 10 interfaced with a video call network 12. Video call network 12 includes twelve video end points 14 that display video calls to end users, five MCUs 16 that coordinate multi-point video conference calls, and two gateways 18 that coordinate interfaces with endpoints using different protocols. For instance, end points 8–12 use protocol H320 and coordinate communications through gateways 18 in order to maintain video calls with end points 1–7, which use protocol H.323. MCUs provide video data from end points 8 and 9 to gateway 1 and from end points 10–12 to gateway 2. Video call network 12 illustrates the manner in which end points, MCUs and gateways are typically used to configure video calls, whether the calls are configured over a single business' video call network or across public telecommunication provider networks to support communications from one business' video call network to another business' video call network.

Video network platform 10 provides automated configuration and scheduling of video calls based on queries received through a scheduling graphical user interface 20. For instance, a user seeking to set up a video call queries video network platform 10 through scheduling graphical user interface 20 regarding the availability of device resources to support a video call between desired end points 14. Video network platform 10 then determines possible configurations and provides the configurations to the scheduling graphical user interface 20 so that the user may schedule devices according to a desired configuration. Alternatively, video network platform 10 determines possible video call configurations and presents the user with the preferred configuration for the user to confirm scheduling. Scheduling graphical user interface 20 may be presented as a web browser page or may be presented through end points 14 using an internet or other network interface 22 that supports communications between video network platform 10 and video call network 12.

A query engine 24 accepts scheduling requests from scheduling graphical user interface 20 and determines video call information from the scheduling requests. For instance, query engine 24 determines the end points 14 involved in the requested video call and the time periods for the requested video call. Query engine 24 provides the video call information to configuration engine 26 which applies device data from device database 28 and rules from rules database 30 to determine possible configurations for the requested video call based on the video call information.

Figures 2, 3, 4:
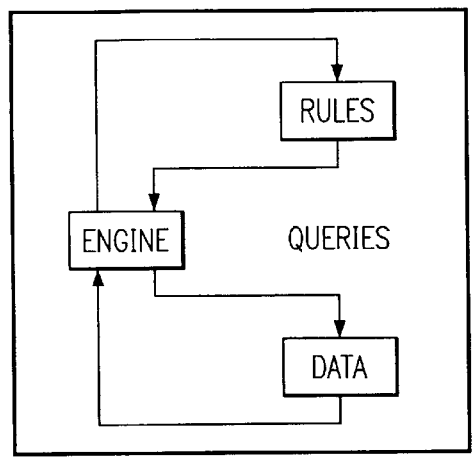
FIG. 2 depicts a block diagram of a rules-based engine.
FIG. 3 depicts a device database storing device data for use by a configuration engine.
FIG. 4 depicts a device database storing end point device data for use by a configuration engine.

Referring briefly to FIG. 2, a block diagram depicts the rules-based approach used by one embodiment of configuration engine 26. Configuration engine 26 is an expert system that accepts queries and applies rules and data to determine video call configurations and schedule video calls. For instance, configuration engine 26 may use a Prolog logic programming language such as XSB, a Prolog-based system available to the public under a GNU library general public license. Although Prolog applications provide good capabilities for scheduling, their pure rules-based approach sometimes does not scale well for larger scheduling problems. Thus, in alternative embodiments in which greater numbers of resource devices are involved, estimation and pruning techniques limit the number of calculations and result in computation of only the most desired configurations in a shorter period of time. Alternative scheduling techniques are also possible either by direct implementation in the configuration engine 26 or by forwarding complex scheduling problems to a separate module.

Referring back to FIG. 1, one alternative for determining an optimal configuration to schedule devices is optimization engine 32. For instance, if configuration engine 26 is a rules-based engine then one rule may direct configuration engine 26 to forward scheduling problems of a predetermined magnitude to optimization engine 32 for a solution. In some instances, such as when the device resources of video call network 12 are near full utilization, the optimization engine 32 may consider overall device scheduling data to optimize the utilization of the device resources in accordance with system priorities as reflected by optimization factors. In another embodiment, optimization engine 32 receives plural video call configurations from configuration engine 26 and determines the preferred video call configuration for scheduling of the video call. In yet another embodiment, the configuration engine could suggest alternatives, such as using alternate calls ("use ep13 instead of ep12"), using alternate call characteristics ("you can do a 384 Kpbs call but not your requested 768 Kpbs call"), and/or using alternate schedules ("you can do your call at 10:00 but not at the requested 11:00").

One factor that affects available video call configurations and the selection of a call configuration for scheduling is the status of devices in video call network 12. An update engine 34 interfaces with device database 28 to maintain accurate data on devices by updating device database 28 when devices change their operational status. For instance, if an MCU becomes non-operational, update engine 34 provides device database 28 with the timeframe for the devices non-operational status so that video call configurations will not include the non-operational device and scheduled video calls that do include the non operational device can be reconfigured by configuration engine 26. In the process of tracking changes in the status of devices, update engine 34 also computes reliability information for storage in device database 28 and for use in determining call configurations. For instance, query engine 24 may assign a priority to a video call request based on participants of the video call so that configuration engine 26 considers device reliability and establishes call configurations for higher priority video calls with more reliable video devices.

The advantages of the video network platform 10 are illustrated through an example of determining video call configurations and scheduling a video call based on an exemplary scheduling request. For instance, a user inputs a request into scheduling graphical user interface 20 for a one hour video conference call at noon among six end points 14, including H.320 end points 10–12 and H.323 end points 1–3. Configuration engine 26 accepts call information from query engine 24 and provides automated determination of device resources available for configuring the requested video call without direct knowledge by the user of the devices, the device capabilities, the device limitations, or the schedules for the devices.

Configuration engine 26 obtains device data from device database 28, such as the device data illustrated by the tables of FIG. 3 and FIG. 4. Applying rules from rules database 30, configuration engine 26 determines that end points 1–3 each use the H.323 protocol from the table of FIG. 4 and require an MCU. For instance, a rule from rules database 30 is applied that states that multi point video calls involving three or more end points require an MCU. Similarly, configuration engine 26 determines that end points 10, 11 and 12 are H.320 protocol end points that require a gateway 18 and an MCU. For instance, configuration engine 26 applies a rule from rules database 30 that states that video call requests between end points with different protocols require the use of a gateway. Other rules in rules database 30 define parameters that configuration engine 26 applies to device data from device database 28 to determine possible video call configurations.

Applying the rules and device data, configuration engine 26 determines a configuration of end points 1, 2 and 3 interfacing with MCU 1 and end points 10, 11 and 12 interfacing with gateway 2 through MCU 3 with the video call completed by interfacing MCU 1 and MCU 3. However, referring to FIG. 3, MCU 3 is currently scheduled for a video call from 11:30 to 12:30. Configuration engine 26 may provide this information to schedule graphical user interface 20 for reference by the user or may provide the information to optimization engine 32 to determine if a video call can be scheduled with the available resources. Optimization engine 32 determines that a schedule for the video call is possible if the call currently scheduled from 11:30 to 12:30 on MCU 3 is reassigned to MCU 2. Once a determination is made of possible call configurations, those call configurations are passed to scheduling graphical user interface 20 for approval by the user. Other factors that may be considered by configuration engine 26 include the number of ports for the MCUs and gateways, the bandwidth capacity of the MCUs and gateways, and the reliability of the MCUs and gateways.

The above example provides a relatively simple application of rules and device data by configuration engine 26 to determine a call configuration and schedule a video call in a video call network 12 of relatively limited size and complexity. However, the video network platform 10 provides a capability to handle a variety of parameters and rules for determining call configurations and scheduling video calls in more complex video call networks 12. Device database 28 may, for instance, include parameters that define the number of concurrent sessions that a given MCU can handle and transcode simultaneously, a bandwidth capacity of MCUs and gateways, the protocols of MCUs, gateways and end points, IP addresses for devices of the video call network, identification and limitations of other network equipment such as routers, and limitations on particular devices such as prohibitions for a particular end point to make international calls. In addition, device database 28 stores schedule information for devices, such as the bandwidth supported by devices in defined time periods, the use of specific end points in defined time periods and the availability of devices for maintenance reasons.

The rules provided by rules database 30 define constraints for devices to be included in a video call configuration, such as that a connection not consume more than a maximum resource available from the affected devices, that devices can connect directly only if the devices use a common protocol, that IP devices can communicate directly if the devices are on the same subnet, that a configuration be selected for scheduling if the configuration has the shortest route among the possible configurations, and that the configurations be reported only if the number of links are less than a predetermined number. By adapting rules to address issues for a particular video call network, the video network platform 10 simplifies interaction with improves the efficiency of video call networks of all sizes, complexities and types.

Although the present invention has been described in detail, it should be understood that various changes, substitutions and alterations can be made hereto without departing from the spirit and scope of the invention as defined by the appending claims.

What is claimed is:

1. A method for configuring video calls, the method comprising:
   querying a platform with video call information for establishing a video call between plural video and points;
   providing the video call information to a rules-based engine; and
   applying rules and device data with the rules-based engine to determine one or more video call configurations for a video call corresponding to the video call information.

2. The method of claim 1 wherein the video call information comprises scheduling resources for video calls.

3. The method of claim 1 wherein the device data comprises schedule capacity and capability information for devices associated with the one or more call configurations.

4. The method of claim 3 wherein the device data comprises the protocol associated with the end point devices.

5. The method of claim 3 wherein the device data comprises the protocol associated with MCU devices.

6. The method of claim 3 wherein one or more of the devices comprises a gateway device.

7. The method of claim 1 wherein the device data comprises bandwidth associated with one or more devices.

8. The method of claim 1 further comprising:
   determining plural call configurations for a video call corresponding to the video call information;
   selecting one of the call configurations based on one or more predetermined optimization factors; and
   scheduling the devices associated with the optimal call configuration for accomplishing the video call.

9. The method of claim 8 wherein the optimization factors comprise the cost associated with the video call configurations.

10. The method of claim 9 wherein the optimization factors comprise the reliability associated with the video call configurations.

11. The method of claim 1 further comprising updating the device data to reflect changes in the status of the devices.

12. The method of claim 1 wherein a rule comprises that an MCU device be used for a multi-point video call.

13. The method of claim 1 wherein a rule comprises that a gateway device be used for a video call having end point devices with different protocols.

14. The method of claim 1 wherein a rule comprises that devices associated with a video call consume not more than a maximum bandwidth associated with each device.

15. The method of claim 1 wherein the video call information comprises a priority for the video call and a rule comprises that a video call be scheduled according to the video call's priority.

16. A system for configuring a video call between video endpoints and supported by devices, the system comprising:
   a query engine that accepts video call information associated with a scheduling request for video call end points;
   a device database that stores device data associated with the video endpoints and the devices;
   a rules database that stores rules associated with the configuration of video calls; and
   a configuration engine interfaced with the query engine, the device database and the rules database, the configuration engine applying the video call information, the device data and the rules to determine one or more video call configurations.

17. The system of claim 16 further comprising an update engine interfaced with the device database, the update engine maintaining device data to reflect changes in the status of devices and end points.

18. The system of claim 16 further comprising an optimization engine operable to select one of the video call configurations based on predetermined optimization factors.

19. The system of claim 16 wherein the configuration engine is operable to select one of the video call configurations and schedule the resources for accomplishing the video call.

20. The system of claim 19 further comprising an optimization engine associated with the configuration engine, the optimization engine operable to optimize the device schedules according to predetermined optimization factors.

21. The system of claim 16 wherein the configuration engine is further operable to provide a user with the plural configurations and accept a configuration selection by the user for scheduling a video call.

* * * * *